United States Patent Office 3,491,535
Patented Jan. 27, 1970

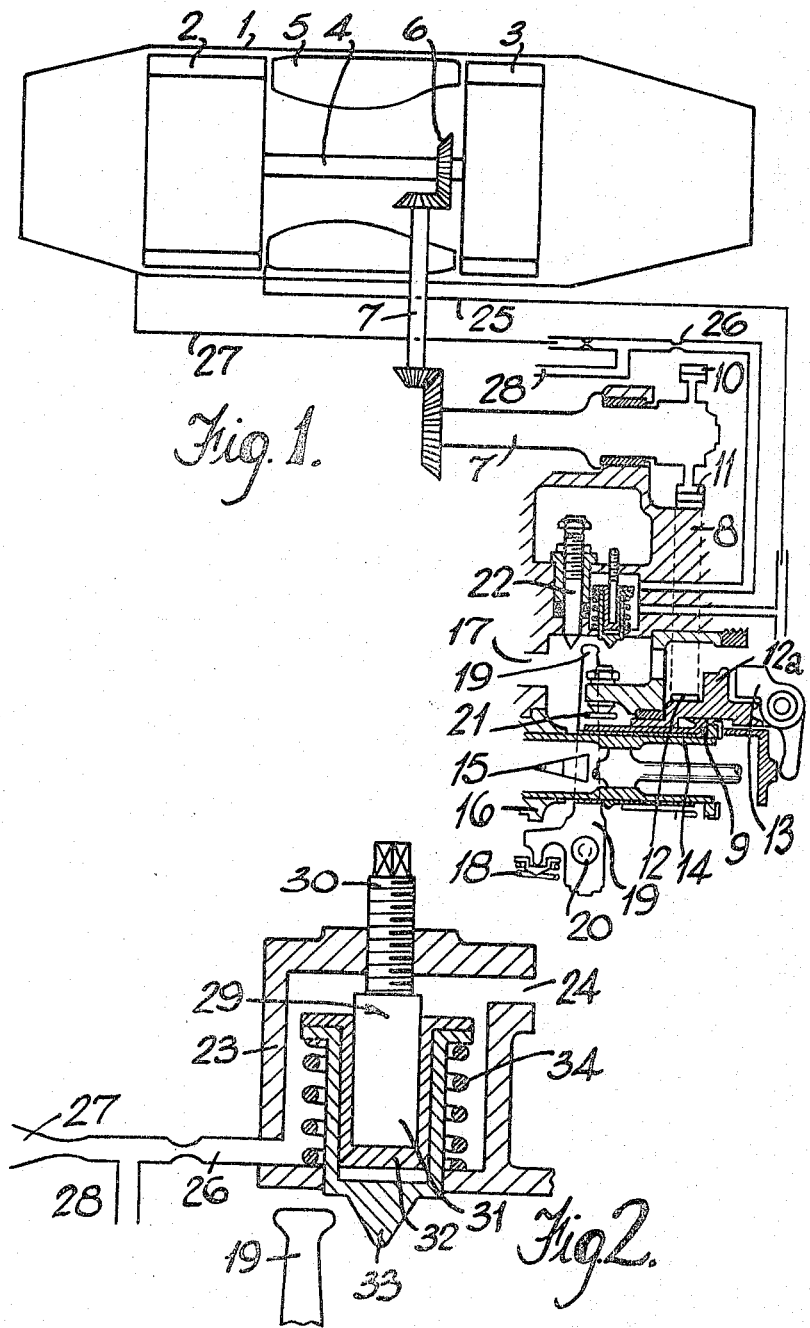

3,491,535
TEMPERATURE RESPONSIVE CONTROL MEANS FOR GAS TURBINE ENGINE FUEL SYSTEMS
Harry Simister Bottoms, Olton, Solihull, England, assignor to Joseph Lucas (Industries) Limited, Birmingham, England
Filed Nov. 27, 1967, Ser. No. 685,894
Int. Cl. F02g 3/00; F02c 9/08
U.S. Cl. 60—39.28    5 Claims

ABSTRACT OF THE DISCLOSURE

A fuel system for a gas turbine engine includes an element which can absorb and give up heat at the same rate as the engine compressor, and has passages whereby the air temperature conditions in the engine compressor also exist around the element, the element being positioned to control the permissible acceleration of the engine by controlling supply of fuel thereto.

---

This invention relates to means for limiting acceleration by the control of the supply of fuel supplied to a gas turbine engine in accordance with temperature changes in the engine.

In gas turbine engines, particularly high performance aircraft engines, the supply of fuel is limited so that acceleration cannot take place at a rate which will permit the occurrence of a phenomenon known as surging. Surging is the breaking up of the smooth flow of air through the engine compressor with resultant deleterious change in the fuel to air ratio supplied to the engine. In order to achieve maximum performance, however, the permissible acceleration should be as close to the limit as possible.

It has been found with known acceleration controls, that when the engine is hot after a period of running, shutting the manual throttle, followed almost immediately by reopening of the throttle tends to cause surging. It is believed that this is due to the fact that, during acceleration after such closure, some of the heat stored in the engine compressor is given up to the air flowing through it. Since the air reaching the combustion zone of the engine is hotter than under normal running conditions, and thus the permissible temperature rise in this zone will be reduced, it is necessary to reduce the quantity of liquid fuel reaching the engine, to minimise the risk of surging.

However, if acceleration is limted to a rate which will prevent surging in the circumstances referred to, this will impose a limit upon performance of the engine which, in other running circumstances, will be unjustified.

The object of the invention is to provide a control means whereby the fuel supplied to the engine in certain circumstances, is such as to limit acceleration to reduce the risk of the creation of circumstances conducive to surging.

In accordance with the present invention means for limiting acceleration by the control of the supply of fuel to a gas turbine engine comprises an element which has the property of absorbing and giving heat at a rate equivalent to that of the compressor of the associated engine, passage means whereby the element is subjected to air temperature conditions existing at the compressor, the element being positioned so that expansion and contraction caused by changes in the temperature of the element controls the position of a device for limiting the permissible acceleration of the engine.

The invention will now be described with reference to the accompanying drawings in which FIGURE 1 is a diagrammatic layout of part of a gas turbine engine fuel system incorporating the invention, and FIGURE 2 is a cross-sectional view of a control means for use in the system of FIGURE 1.

In FIGURE 1 there is shown diagrammatically, a gas turbine engine having an outer casing 1 having an air inlet at its upstream end and an exhaust outlet nozzle at its downstream end, the casing containing a compressor 2, a turbine 3 connected to the compressor by a driving shaft 4, and combustion chamber 5 to which air from the compressor 2 is delivered and from which products of combustion are discharged through the turbine 3. A bevel gear 6 on the shaft 4 drives a shaft 7 mounted in a casing 8 for a fuel control device, part of which only is illustrated.

The fuel control device has an axially movable composite outer sleeve 9 which is rotated by the shaft 7 through a gear 10 carried on the shaft 7, an intermediate gear 11, and a further gear ring 12 mounted upon a cage 12a. The cage 12a is axially fixed within the casing 8. Mounted upon the cage 12a is a set of weights 13 which act as a speed responsive device to control the axial position of the outer sleeve 9. Within the outer sleeve 9 is an axially slidable but non-rotatable inner sleeve 14. This inner sleeve 14 has at least one triangular orifice 15 in its wall. The relative axial positions of the outer and inner sleeves 9, 14 and the axial position of the outer sleeve 9 with respect to a fixed coaxial outer sleeve 16 in the casing 8, determines the area of the orifice 15 which is available for the flow of fuel therethrough.

The casing has an inlet passage 17 for fuel which flows through the orifice 15 to an outlet (not shown) to the engine. The axial movement of the outer sleeve 9 under the action of the set of weights 13 is resisted by a spring 18 acting against a lever 19 pivoted on the casing 8 at 20. The lever 19 is connected to the outer sleeve 9 by means of a set of rollers 21.

Swinging movement of the lever 19 is limited by two adjustable stops, one of which, indicated at 22, limits deceleration and the other of which, shown in FIGURE 2, limits acceleration.

With reference to FIGURE 2, the acceleration stop comprises a body 23 fixed in the casing 8, into the interior of which air from the engine compressor is delivered through an inlet 24. This air is obtained from the downstream side of the compressor 2 of the engine, through a passage indicated at 25. This air is also of course at the temperature of the air delivered from the compressor 2. The air can escape from the body 23 through a restricted passage 26 which forms part of an air potentiometer with a further passage 27 and an intermediate passage 28. The passage 27 communicates with the upstream side of the compressor 2 of the engine. The air pressure in the passage 28 is applied to another part of the fuel system (not shown) whereby the axial position of the inner sleeve 14 can be varied.

Within the body 23 is disposed an element 29 which is adjustably connected to the body 23 by means of a screw 30. The element 29 is in three pieces indicated at 31, 32 and 33, the three pieces being formed from materials having different coefficients of thermal expansion. A spring 34 acts between the body 23 and the element 29. The three pieces of the element 29 are all subjected to any temperature changes in the air flowing over them and in use, if a temperature rise occurs, the inner piece 31 expands and causes the piece 32 to move bodily by an amount corresponding to the lengthwise expansion of the piece 31. The piece 32 also itself expands. The piece 33 is moved bodily by an amount corresponding to the sum of the movement of the piece 32 and its expansion. The piece 33 also, of course, itself expands and the resulting movement determines the position of the pointed end of the piece 33. This, in turn, determines the maximum permitted movement of the lever 19 and thus the maximum fuel supply to the engine.

The element 29 though of course much smaller than the compressor, has the property of absorbing and giving up heat at a rate equivalent to that of the compressor. The rate of supply of air to the element 29 is in the same proportion to the flow of air over the compressor as the sizes of these parts so that the element 29 will provide a signal in the form of a limit to the permitted movement of the lever 19, which is related to the temperature of the air flowing over the compressor. The element 29 is thus used to gauge the heat stored in the compressor so that an appropriate change in fueling can be accomplished when conditions favourable for the occurance of surging are existing.

It is to be understood that the invention can also be applied to other forms of acceleration control device for gas turbine engines, for example, electrical or electronic devices. These incorporate an element having the appropriate specfic heat which is arranged to control the acceleration rate of the engine.

Having thus described my invention what I claim as new and desire to secure by Letters Patent is:

1. Means for limiting acceleration of a gas turbine engine comprising a control whereby the supply of fuel to the engine is determined, an element disposed to limit movement of said control, a body within which the element is mounted, passage means to the interior of the body, said passage means being connectable to the outlet of the compressor stage of the associated engine to supply to said element a flow of air proportional to that which takes place through the compressor, thermal expansion and contraction of the element varying its extension out of the body to change the permitted limit of movement of said control, and the element being capable of absorbing and giving up heat at a rate which is proportional to that of the compressor.

2. Means as claimed in claim 1 in which the element comprises three pieces, one piece being fixed in the body at one end, another piece engaging the other end and having its own other end engaging the third piece, and the third piece being disposed to be engaged by said control.

3. Means as claimed in claim 1 in which the element is adjustably mounted in the body.

4. A fuel system for a gas turbine engine comprising a pump, a passage from the pump to the engine, a variable device for controlling the flow of fuel through said passage, a control connected to said device whereby the supply of fuel to the engine is determined, an element disposed to limit movement of said control, a body within which the element is mounted, passage means to the interior of the body, said passage means being connectable to the outlet of the compressor stage of the associated engine, to supply to said element a flow of air proportional to that which takes place through the compressor, thermal expansion and contraction of the element varying its extension out of the body to change the permitted limit of movement of said control, and the element being capable of absorbing and giving up heat at a rate which is proportional to that of the compressor.

5. A fuel system as claimed in claim 4 in which the element is arranged to limit movement of the control in a direction to increase the quantity of fuel reaching the engine.

References Cited

UNITED STATES PATENTS

| 2,667,743 | 2/1954 | Lee | 60—39.28 |
| 2,833,114 | 5/1958 | Perle | 60—39.28 |
| 2,857,742 | 10/1958 | Drake | 60—39.28 |
| 2,910,125 | 10/1959 | Best | 60—39.28 |

AL LAWRENCE SMITH, Primary Examiner